US011890865B2

(12) United States Patent
Kobayashi et al.

(10) Patent No.: US 11,890,865 B2
(45) Date of Patent: Feb. 6, 2024

(54) MOVABLE ASSEMBLY AND PRINTING APPARATUS

(71) Applicant: BROTHER KOGYO KABUSHIKI KAISHA, Nagoya (JP)

(72) Inventors: Akihiro Kobayashi, Yokkaichi (JP); Kengo Takeda, Tokai (JP); Takayuki Akimatsu, Nagoya (JP); Takahiro Nishimoto, Ogaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 127 days.

(21) Appl. No.: 17/709,983

(22) Filed: Mar. 31, 2022

(65) Prior Publication Data

US 2022/0314661 A1 Oct. 6, 2022

(30) Foreign Application Priority Data

Mar. 31, 2021 (JP) ................................ 2021-059347

(51) Int. Cl.
*B41J 11/06* (2006.01)
*B41J 11/00* (2006.01)
(Continued)

(52) U.S. Cl.
CPC .......... *B41J 11/06* (2013.01); *B41J 11/00214* (2021.01); *B41J 11/20* (2013.01); *B66F 7/025* (2013.01)

(58) Field of Classification Search
CPC . B41J 11/20; B41J 11/06; B41J 11/008; B41J 11/00214; B41J 25/308; B41J 29/06;
(Continued)

(56) References Cited

U.S. PATENT DOCUMENTS 3,568,804 A * 3/1971 Olsen ...................... B66F 7/025 187/244
5,394,201 A * 2/1995 Hauptli .................. A61B 3/132 351/205
(Continued)

FOREIGN PATENT DOCUMENTS

JP 2008-201107 A 9/2008
JP 2020-151963 A 9/2020
WO 2017/086006 A1 5/2017

*Primary Examiner* — John Zimmermann
(74) *Attorney, Agent, or Firm* — KENEALY VAIDYA LLP

(57) ABSTRACT

A movable assembly configured to move a table in a first direction is provided. The movable assembly includes a first link member including a first elongated member and a second elongated member coupled in an X formation, a second link member including a third elongated member and a fourth elongated member coupled in the X formation, a first frame member, a second frame member, and a rotatable member being a threaded rod. The first frame member includes a first supporting portion and a first guiding portion, which support ends of the first, second, third, and fourth elongated members on one side rotatably. The second frame member includes a second supporting portion and a second guiding portion, which support other ends of the first, second, third, and fourth elongated members located on the other side movably in the third direction.

12 Claims, 9 Drawing Sheets

(51) Int. Cl.
*B41J 11/20* (2006.01)
*B66F 7/02* (2006.01)

(58) Field of Classification Search
CPC ....... A47B 9/16; B29C 64/232; B29C 64/245; B66F 7/025; A61B 3/132
See application file for complete search history.

(56) References Cited

U.S. PATENT DOCUMENTS

| | | | | |
|---|---|---|---|---|
| 9,259,944 | B2 * | 2/2016 | Moriya | B41J 11/20 |
| 9,308,757 | B2 * | 4/2016 | Lutz | B41J 25/308 |
| 9,365,061 | B2 * | 6/2016 | King | B41J 25/308 |
| 2007/0227446 | A1 * | 10/2007 | Moon | B41J 3/28 118/663 |
| 2008/0024582 | A1 * | 1/2008 | Yokoyama | B41J 11/007 347/104 |
| 2009/0231404 | A1 * | 9/2009 | Niekawa | B41J 11/0021 347/102 |
| 2020/0298599 | A1 | 9/2020 | Tsuchiya | |
| 2022/0193996 | A1 * | 6/2022 | Durand | B29C 64/393 |

* cited by examiner

MOVABLE ASSEMBLY AND PRINTING APPARATUS

CROSS REFERENCE TO RELATED APPLICATION

This application claims priority under 35 U.S.C. § 119 from Japanese Patent Application No. 2021-059347, filed on Mar. 31, 2021, the entire subject matter of which is incorporated herein by reference.

BACKGROUND

The present disclosure is related to a movable assembly for moving a table and to a printing apparatus.

A table assembly having an expandable device, in which a pair of link members are arranged to face each other, to lift or lower a table, is known. Each link member may include a pair of elongated members assembled to cross in an X formation to pivot with respect to each other. The expandable device may have the table on an upper side and a supporting member at a lower side. The supporting member may support lower ends of the elongated members. In particular, on one side in a front-rear direction, the supporting member may support a lower end of one of the elongated members in one of the paired link members and a lower end of one of the elongated members in the other of the paired link members rotatably with pins and round holes; and on the other side in the front-rear direction, the supporting member may support a lower end of the other of the elongated members in the one of the paired link members and a lower end of the other of the elongated members in the other of the paired link members movably in a front-rear direction with pins and elongated holes. A driving motor may be provided on a front side of the supporting member and may move the lower ends of the latter ones of the paired elongated members frontward or rearward. As the driving motor moves the lower ends of the latter ones of the elongated members rearward toward the lower ends of the former ones of the elongated members, the paired elongated members may pivot with respect to each other to rise from a lower orientation, in which the elongated members extend approximately horizontally in the front-rear direction, to a higher orientation, in which the elongated members extend approximately in a vertical direction, to shift the table upward. On the other hand, as the driving motor moves the lower ends of the latter ones of the elongated members frontward to be away from the lower ends of the former ones of the elongated members, the paired elongated members may pivot with respect to each other to lie down from the higher orientation, in which the elongated members extend approximately in the vertical direction, to the lower orientation, in which the elongated members extend approximately horizontally in the front-rear direction, to shift the table downward.

SUMMARY

In the known table assembly, when the table is at a lowermost position, the elongated members in the link members may lie flat approximately horizontally along the front-rear direction on the supporting member. For lifting the table from the lowermost position, the driving motor may need to generate a large amount of force to pivot the elongated members to rise from the lying-flat posture. In such a table assembly, when the table with a load applied thereon is lifted from the lowermost position, the driving motor may be subjected to a large amount of load.

The present disclosure is advantageous in that a movable assembly and a printing apparatus, in which a load required in moving a table may be reduced, are provided.

According to an aspect of the present disclosure, a movable assembly configured to move a table in a first direction, having a first link member, a second link member, a first frame member, a second frame member, and a rotatable member, is provided. The first link member includes a first elongated member and a second elongated member coupled in an X formation pivotably with respect to each other. The first link member is expandable and contractable in the first direction. The second link member includes a third elongated member and a fourth elongated member coupled in the X formation pivotably with respect to each other. The second link member is expandable and contractable in the first direction. The third elongated member is arranged to face the first elongated member in a second direction. The second direction intersects with the first direction. The fourth elongated member is arranged to face the second elongated member in the second direction. On the first frame member, one end, in the first direction, of the first link member and one end, in the first direction, of the second link member are located. On the second frame member, the other end, in the first direction, of the first link member and the other end, in the first direction, of the second link member are located. The second frame member supports the table thereon. The table is positioned opposite to the first frame member with respect to the second frame member in the first direction. The second frame member includes an engagement part. The rotatable member is a threaded rod. The rotatable member is engaged with the engagement part. The rotatable member is configured to move the second frame member and the table in the first direction by its rotation. The first frame member includes a first supporting portion and a first guiding portion. The first supporting portion supports one end, in a third direction, of the first elongated member in the first link member and one end, in the third direction, of the third elongated member rotatably. The third direction intersects with the first direction and the second direction. The first guiding portion supports one end, in the third direction, of the second elongated member in the first link member and one end, in the third direction, of the fourth elongated member in the second link member movably in the third direction. The second frame member includes a second supporting portion supporting the other end, in the third direction, of the second elongated member in the first link member and the other end, in the third direction, of the fourth elongated member in the second link member rotatably, and a second guiding portion supporting the other end, in the third direction, of the first elongated member in the first link member and the other end, in the third direction, of the third elongated member in the second link member movably in the third direction.

According to another aspect of the present disclosure, a printing apparatus, having a movable assembly configured to move a table in a first direction and a head configured to discharge ink at a printable object placed on the table in the movable assembly, is provided. The movable assembly has a first link member, a second link member, a first frame member, a second frame member, and a rotatable member. The first link member includes a first elongated member and a second elongated member coupled in an X formation pivotably with respect to each other. The first link member is expandable and contractable in the first direction. The second link member includes a third elongated member and a fourth elongated member coupled in the X formation pivotably with respect to each other. The second link member is expandable and contractable in the first direction. The third elongated member is arranged to face the first elongated member in a second direction. The second direction intersects with the first direction. The fourth elongated member is arranged to face the second elongated member in the second direction. On the first frame member, one end, in the first direction, of the first link member and one end, in the first direction, of the second link member are located. On the second frame member, the other end, in the first direction, of the first link member and the other end, in the first direction, of the second link member are located. The second frame member supports the table thereon. The table is positioned opposite to the first frame member with respect to the second frame member in the first direction. The second frame member includes an engagement part. The rotatable member is a threaded rod. The rotatable member is engaged with the engagement part. The rotatable member is configured to move the second frame member and the table in the first direction by its rotation. The first frame member includes a first supporting portion and a first guiding portion. The first supporting portion supports one end, in a third direction, of the first elongated member in the first link member and one end, in the third direction, of the third elongated member rotatably. The third direction intersects with the first direction and the second direction. The first guiding portion supports one end, in the third direction, of the second elongated member in the first link member and one end, in the third direction, of the fourth elongated member in the second link member movably in the third direction. The second frame member includes a second supporting portion supporting the other end, in the third direction, of the second elongated member in the first link member and the other end, in the third direction, of the fourth elongated member in the second link member rotatably, and a second guiding portion supporting the other end, in the third direction, of the first elongated member in the first link member and the other end, in the third direction, of the third elongated member in the second link member movably in the third direction.

DETAILED DESCRIPTION

In the following paragraphs, with reference to the accompanying drawings, a printer 1 according to an embodiment of the present disclosure will be described. It is noted that the printer described below is merely one embodiment of the present disclosure, and various connections may be set forth between elements in the following description. These connections in general and, unless specified otherwise, may be direct or indirect and that this specification is not intended to be limiting in this respect.

Figure 1:
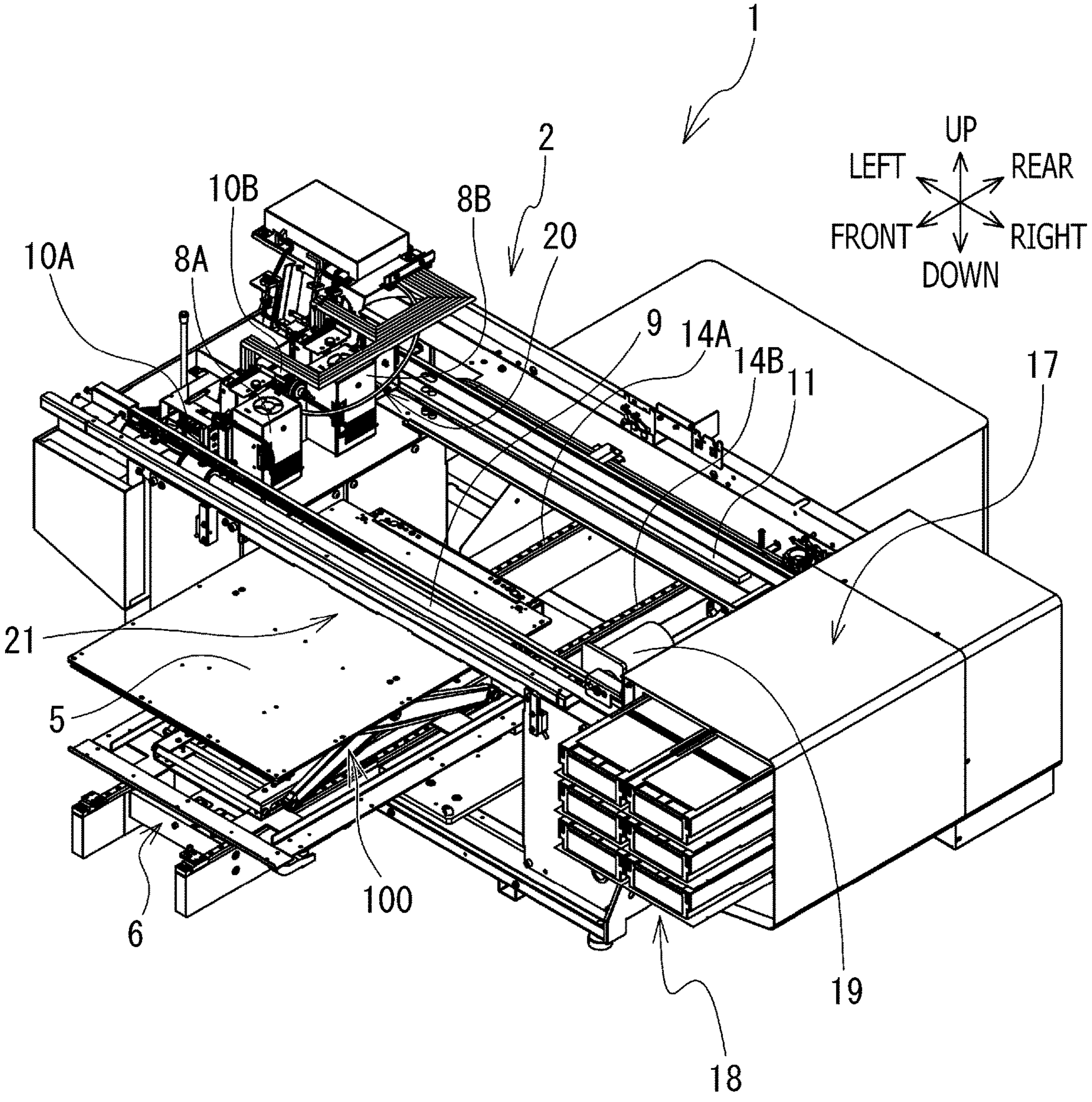
FIG. 1 is a perspective view of a main body 2 of a printer 1, viewed from an upper right-and-frontward position, according to an embodiment of the present disclosure.
Figure 2:
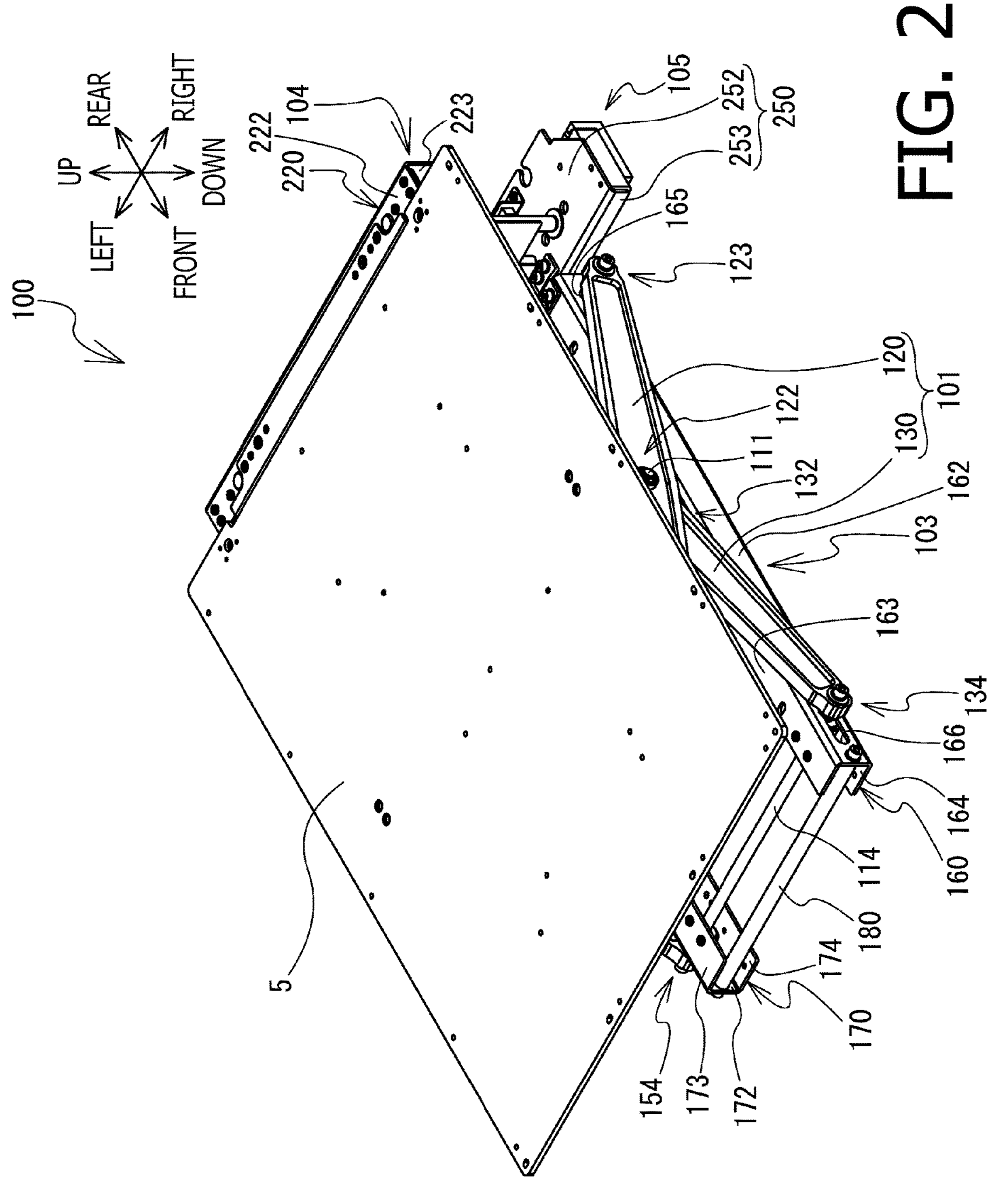
FIG. 2 is a perspective view of a lift assembly 100 with a platen 5 mounted thereon, viewed from an upper right-and-frontward position, according to the embodiment of the present disclosure.

In the present embodiment, an upper side, a lower side, a lower-leftward side, an upper-rightward side, a lower-rightward side, and an upper-leftward side in FIG. 1 coincide with an upper side, a lower side, a front side, a rear side, a rightward side, and a leftward side, respectively, of the printer 1. In the following paragraphs, a right-to-left or left-to-right direction may be called as a crosswise direction or a main-scanning direction, and a front-to-rear or rear-to-front direction may be called as a front-rear direction or a sub-scanning direction. In the present embodiment, mechanical elements appearing in the drawings may be drawn substantially in an actual scale. The printer 1 may be a printing apparatus that may print images including characters, text, figures, and symbols on a printable object by ejecting ultraviolet-curable ink. In the following description, the ultraviolet-curable ink will be called as "UV ink."

With reference to FIG. 1, an overall configuration of the printer 1 will be described below. As shown in FIG. 1, the printer 1 has a main body 2, which includes an attachment area 17, a conveyer 6, a lift assembly 100, and a platen 5. FIG. 1 shows the printer 1 with an exterior cover being removed. The main body 2 has an opening 21 formed there-through in the front-rear direction. The printer 1 has an operation device, through which commands from a user to manipulate the printer 1 may be input, at, for example, a rightward position with respect to the opening 21 on a front side of the main body 2. The attachment area 17 may be arranged on a rightward side of the main body 2. In the attachment area 17, a plurality of cartridges 18 may be attached from the front side. The cartridges 18 may contain UV inks in different colors to be used in printing images.

The conveyer 6 is arranged at a lower position in the opening 21. The conveyer 6 may convey the lift assembly 100 in the front-rear direction. The conveyer 6 includes a pair of guide rails 14A, 14B. The guide rails 14A, 14B extend in the front-rear direction. The guide rails 14A, 14B are spaced apart from each other in the crosswise direction and extend in parallel with each other. The guide rails 14A, 14B support the lift assembly 100 movably in the sub-scanning direction, which is, according to the present embodiment, the front-rear direction. At a lower position in the lift assembly 100, a sub-scanning motor (not shown) is arranged. As the sub-scanning motor runs, the lift assembly 100 may move along the guide rails 14A, 14B in the front-rear direction. FIG. 1 shows the lift assembly 100 moved to a frontward end position.

The platen 5 is a plate having, for example, a rectangular shape in a plan view. The platen 5 is supported by the lift assembly 100. The platen 5 is movable in the front-rear direction along with the lift assembly 100. On an upper surface of the platen 5, a non-absorbent material, such as a plastic sheet made of, for example, polyethylene terephthalate (PET) or polycarbonate (PC), may be placed as a printable object.

The main body 2 includes a guiding shaft 9, a guide rail 11, and a carriage 20. The guiding shaft 9 and the guide rail 11 longitudinally extend in the crosswise direction. The guiding shaft 9 is located at an upper-frontward position in the main body 2. The guide rail 11 is located at a position rearward and spaced apart from the guiding shaft 9 and extends in parallel with the guiding shaft 9. The guiding shaft 9 and the guide rail 11 support the carriage 20 movably in the main scanning direction, which is, according to the present embodiment, the crosswise direction. At a position rightward from a rightward end of the guiding shaft 9, a main scanning motor 19 is arranged. As the main scanning motor 19 runs, the carriage 20 may move in the crosswise direction along the guiding shaft 9 and the guide rail 11. FIG. 1 shows the carriage 20 moved to a leftward end of a movable range.

The carriage 20 includes heads 10A, 10B, which may discharge the UV inks downward, and UV emitters 8A, 8B, which may emit UV rays downward. According to the present embodiment, the heads 10A, 10B include piezoelectric elements to pressurize the UV inks. Alternatively, the heads 10A, 10B may have heaters to heat the UV inks in place of the piezoelectric elements. The UV emitters 8A, 8B are located at positions rightward from the heads 10A, 10B, respectively. The UV emitters 8A, 8B may irradiate the UV inks, which are discharged by the heads 10A, 10B at the printable object, with the UV rays.

According to the above configuration, the printer 1 may move the heads 10A, 10B and the UV emitters 8A, 8B in the main scanning direction. The printer 1 may discharge the UV inks from nozzles of the heads 10A, 10B at the printable object placed on the platen 5 and emit the UV rays from the UV emitters 8A, 8B at the discharged UV inks to cure the UV inks. The printer 1 may move the platen 5 in the sub-scanning direction. The printer 1 may repeat these actions to print an image, including text, figures, symbols, etc., on the printable object on the platen 5.

Figure 3:
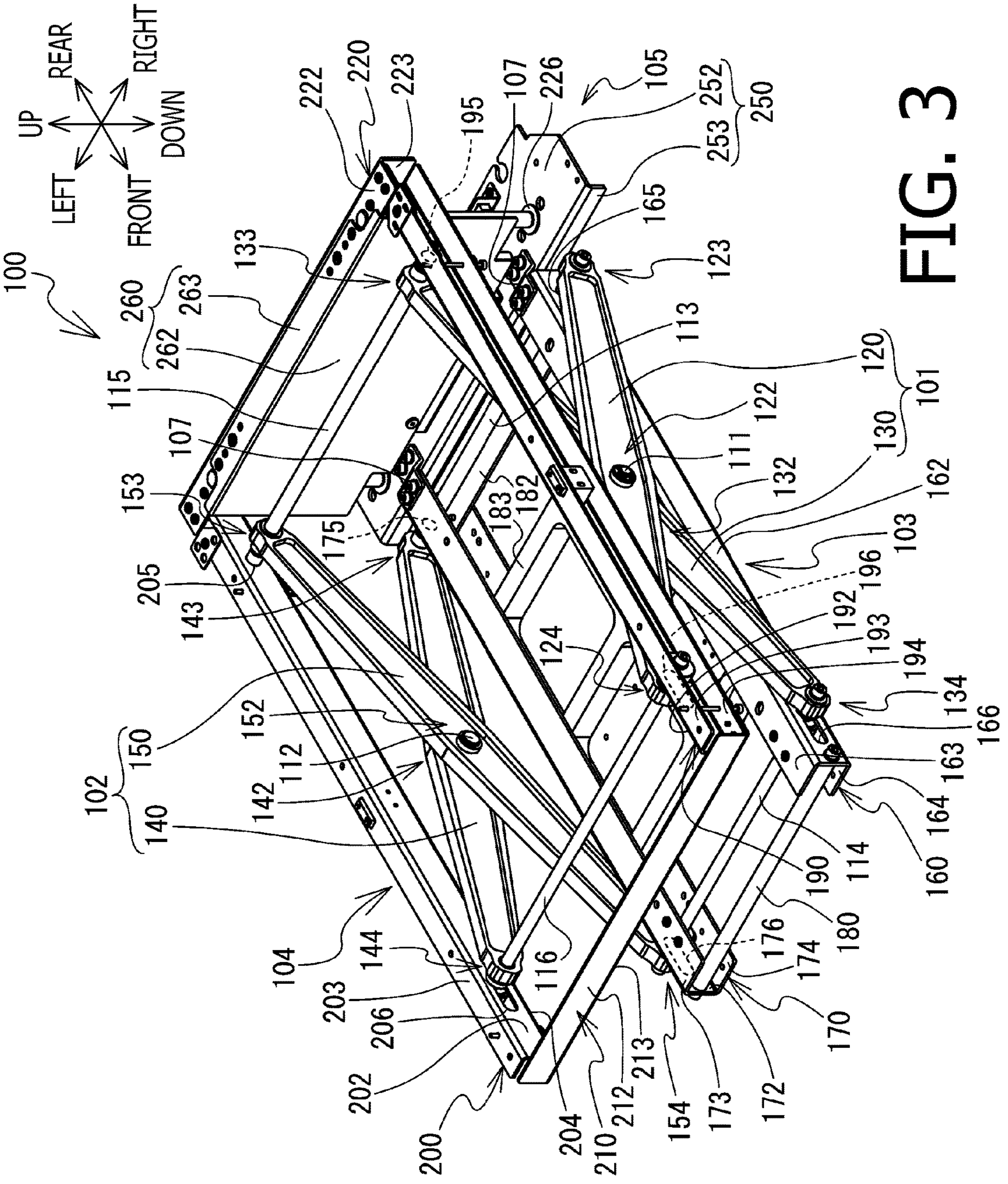
FIG. 3 is a perspective view of the lift assembly 100, viewed from an upper right-and-frontward position, according to the embodiment of the present disclosure.

With reference to FIGS. 2-6, the configuration of the lift assembly 100 will be described in detail. The lift assembly 100 shown in FIG. 2 may, for example, for printing an image, move the platen 5 in the vertical direction and locate the printable object placed on the platen 5 at a position, in which a distance in the vertical direction from the heads 10A, 10B is correct. FIG. 3 shows the lift assembly 100, from which the platen 5 (see FIG. 2) is removed. As shown in FIG. 3, the lift assembly 100 includes a rightward link member 101, a leftward link member 102, a lower frame member 103, an upper frame member 104, and a driving device 105.

Figure 4:
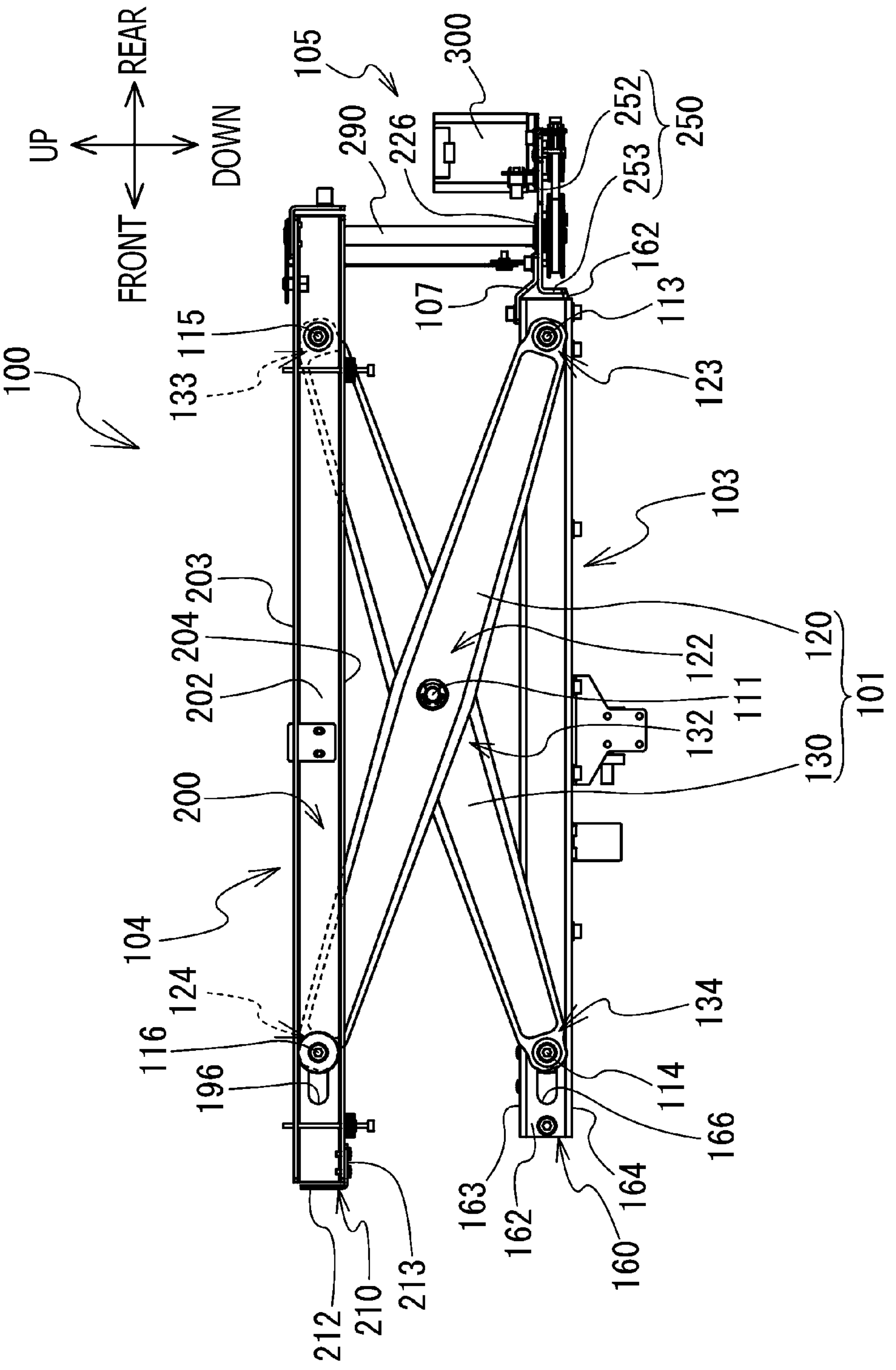
FIG. 4 is a rightward side view of the lift assembly 100 according to the embodiment of the present disclosure.

The rightward link member 101 includes two elongated members 120, 130. The elongated members 120, 130 are elongated plates made of steel. Edges of the elongated members 120, 130 jut out in a direction of thickness of the elongated members 120, 130 on both sides. Thus, the elongated members 120, 130 may have an enhanced strength against a bending force. The elongated member 120 is in substantially a same shape as the elongated member 130. The elongated member 120 may be located at a position rightward from the elongated member 130. The elongated members 120, 130 are supported by a coupling shaft 111 at central areas 122, 132 in respective lengthwise directions and are pivotably coupled to each other in an X formation. A rearward end portion 123, which is an end of the elongated member 120 toward one side in the front-rear direction, is located rearward with respect to a frontward end portion 124, which is an end of the elongated member 120 toward the other side in the front-rear direction, and is located to be lower than a rearward end portion 133, which is an end of the elongated member 130 toward the other side in the front-rear direction. A frontward end portion 134, which is an end of the elongated member 130 toward the one side in the front-rear direction, is located frontward with respect to the rearward end portion 133 and to be lower than the frontward end portion 124 of the elongated member 120. The elongated member 120 has a tapered shape toward each lengthwise end, in which a width is reduced from the central area 122 toward the frontward end portion 124 and toward the rearward end portion 123, in a sideward view. The elongated member 130 has a tapered shape toward each lengthwise end, in which a width is reduced from the central area 132 toward the frontward end portion 134 and toward the rearward end portion 133, in a sideward view. Shapes of the parts of the elongated members 120, 130 ranging from the central areas 122, 132 to the frontward end portions 124, 134, are substantially the same as shapes of the parts of the elongated members 120, 130 ranging from the central areas 122, 132 to the rearward end portions 123, 133, respectively. Therefore, as shown in FIG. 4, each of the elongated members 120, 130 may form a narrow parallelogram in the sideward view.

As shown in FIG. 3, the leftward link member 102 is in substantially the same configuration as the rightward link member 101 and forms a pair with the rightward link member 101. The leftward link member 102 is located leftward with respect to the rightward link member 101 to face the rightward link member 101. The leftward link member 102 includes two elongated members 140, 150. The elongated members 140, 150 are elongated plates made of steel. Edges of the elongated members 140, 150 jut out in a direction of thickness of the elongated members 140, 150 on both sides. Thus, the elongated members 140, 150 may have an enhanced strength against a bending force. The elongated member 140 is in substantially a same shape as the elongated member 150. The elongated member 140 may be located at a position leftward from the elongated member 150. The elongated members 140, 150 are supported by a coupling shaft 112 at central areas 142, 152 in respective lengthwise directions and are pivotably coupled to each other in the X formation. A rearward end portion 143, which is an end of the elongated member 140 toward the one side in the front-rear direction, is located rearward with respect to a frontward end portion 144, which is an end of the elongated member 140 toward the other side in the front-rear direction, and is located to be lower than a rearward end portion 153, which is an end of the elongated member 150 toward the other side in the front-rear direction. A frontward end portion 154, which is an end of the elongated member 150 toward the one side in the front-rear direction, is located frontward with respect to the rearward end portion 153 and to be lower than the frontward end portion 144 of the elongated member 140. The elongated member 140 has a tapered shape toward each lengthwise end, in which a width is reduced from the central area 142 toward the frontward end portion 144 and toward the rearward end portion 143, in a sideward view. The elongated member 150 has a tapered shape toward each lengthwise end, in which a width is reduced from the central area 152 toward the frontward end portion 154 and toward the rearward end portion 153, in a sideward view. Shapes of the parts of the elongated members 140, 150 ranging from the central areas 142, 152 to the frontward end portions 144, 154, are substantially the same as shapes of the parts of the elongated members 140, 150 ranging from the central areas 142, 152 to the rearward end portions 143, 153, respectively. Therefore, similarly to the elongated members 120, 130, each of the elongated members 140, 150 may form a narrow parallelogram in the sideward view.

The lower frame member 103 is located on a lower side of the rightward link member 101 and the leftward link member 102. The lower frame member 103 supports the rightward link member 101 and the leftward link member 102 from a lower side. The lower frame member 103 includes a rightward lower frame part 160, a leftward lower frame part 170, a frontward bridge part 180, a rearward bridge part 182, and a midst bridge part 183. The rightward lower frame part 160 and the leftward lower frame part 170 extend in the front-rear direction and are arranged to face each other across a gap in the crosswise direction. The rightward lower frame part 160 and the leftward lower frame part 170 are supported by the frontward bridge part 180, the rearward bridge part 182, and the midst bridge part 183, which bridge the gap between the rightward lower frame part 160 and the leftward lower frame part 170. The rightward lower frame part 160 is a piece formed by bending a steel plate. The rightward lower frame part 160 includes a side plate 162, an upper plate 163, and a lower plate 164. The side plate 162 has a rectangular shape elongated in the front-rear direction, and a direction of thickness thereof coincides with the crosswise direction. The upper plate 163 and the lower plate 164 extend leftward in planes from an upper edge and a lower edge, respectively, of the side plate 162. The elongated members 120, 130 of the rightward link member 101 are arranged at a leftward position with respect to the side plate 162. The leftward lower frame part 170 is in a substantially same configuration as the rightward lower frame part 160 and is paired with the rightward lower frame part 160. The leftward lower frame part 170 is arranged at a leftward position with respect to the rightward lower frame part 160 to face with the rightward lower frame part 160. The leftward lower frame part 170 is a piece formed by bending a steel plate. The leftward lower frame part 170 includes a side plate 172, an upper plate 173, and a lower plate 174. The side plate 172 has a rectangular shape elongated in the front-rear direction, and a direction of thickness thereof coincides with the crosswise direction. The upper plate 173 and the lower plate 174 extend rightward in planes from an upper edge and a lower edge, respectively, of the side plate 172. The elongated members 140, 150 of the leftward link member 102 are arranged at a leftward position with respect to the side plate 172.

The frontward bridge part 180 is a round rod made of steel. One end and the other end of the frontward bridge part 180 are fixed to a frontward end area on a leftward face of the side plate 162 of the rightward lower frame part 160 and to a frontward end area on a rightward face of the side plate 172 of the leftward lower frame part 170, respectively, with screws. The rearward bridge part 182 extends in the crosswise direction in an arrangement such that a direction of thickness thereof coincides with the vertical direction. The rearward bridge part 182 is a plate made of steel. The rearward bridge part 182 is in an arrangement such that a rightward end thereof is located on an upper side of the lower plate 164 in a rearward end area of the rightward lower frame part 160 and is fixed to the lower plate 164 with a screw. Moreover, the rearward bridge part 182 is in an arrangement such that a leftward end thereof is located on an upper side of the lower plate 174 in a rearward end area of the leftward lower frame part 170 and is fixed to the lower plate 174 with a screw. The midst bridge part 183 is a plate made of steel. The midst bridge part 183 is located between the frontward bridge part 180 and the rearward bridge part 182 in the front-rear direction. The midst bridge part 183 is in an arrangement such that a rightward edge thereof is located between the upper plate 163 and the lower plate 164 in a midst area in the front-rear direction of the rightward lower frame part 160 and is fixed to the lower plate 164 with a screw. Moreover, the midst bridge part 183 is in an arrangement such that a leftward edge thereof is located between the upper plate 173 and the lower plate 174 in a midst area in the front-rear direction of the leftward lower frame part 170 and is fixed to the lower plate 174 with a screw.

The side plate 162 of the rightward lower frame part 160 and the side plate 172 of the leftward lower frame part 170 have round-shaped supporting holes 165, 175, respectively, in respective rearward end areas. Through the supporting holes 165, 175, a supporting shaft 113 being a round rod, which extends in the crosswise direction, is inserted. The supporting shaft 113 is rotatably supported by the supporting holes 165, 175. The elongated member 120 in the rightward link member 101 retains a rightward end of the supporting shaft 113 rotatably at a rearward end portion 123 thereof on a rightward side of the supporting hole 165. The elongated member 140 in the leftward link member 102 retains a leftward end of the supporting shaft 113 rotatably at a rearward end portion 143 thereof on a leftward side of the supporting hole 175. Thus, the elongated member 120 and the elongated member 140 are pivotable with respect to the rearward end area of the rightward lower frame part 160 and a rearward end area of the leftward lower frame part 170, respectively.

The side plate 162 of the rightward lower frame part 160 and the side plate 172 of the leftward lower frame part 170 have ellipse-shaped guiding holes 166, 176, respectively, which are elongated in the front-rear direction in respective frontward end areas. Through the guiding holes 166, 176, a guiding shaft 114 being a round rod, which extends in the crosswise direction, is inserted. The guiding shaft 114 is movable in the front-rear direction along the guiding holes 166, 176 and is rotatably supported by the guiding holes 166, 176. The elongated member 130 of the rightward link member 101 retains a rightward end of the guiding shaft 114 rotatably at the frontward end portion 134 thereof on a rightward side of the guiding hole 166. The elongated member 150 of the leftward link member 102 retains a leftward end of the guiding shaft 114 rotatably at the frontward end portion 154 thereof on a leftward side of the guiding hole 176. Thus, the elongated member 130 and the elongated member 150 are pivotable and movable in the front-rear direction with respect to the frontward end area of the rightward lower frame part 160 and the frontward end area of the leftward lower frame part 170, respectively.

The rightward lower frame part 160 and the leftward lower frame part 170 are formed by bending steel plates to secure rigidity against an external bending force. The frontward bridge part 180, the rearward bridge part 182, and the midst bridge part 183, which connect the rightward lower frame part 160 and the leftward lower frame part 170, are fixed to the rightward lower frame part 160 and the leftward lower frame part 170, to locate the rightward lower frame part 160 and the leftward lower frame part 170 at correct positions with respect to each other. The midst bridge part 183 providing a rib structure may secure rigidity of the lower frame member 103. Thus, the lower frame member 103 may be sufficiently rigid against bending forces in the vertical direction and a twisting force.

The upper frame member 104 is arranged on an upper side of the rightward link member 101 and the leftward link member 102. The upper frame member 104 supports the platen 5, which is placed on top of the upper frame member 104. The upper frame member 104 is supported by the rightward link member 101 and the leftward link member 102 movably in the vertical direction. The upper frame member 104 extends in the front-rear direction. The upper frame member 104 includes a rightward upper frame part 190 and a leftward upper frame part 200, which are arranged to face each other in the crosswise direction, and a frontward frame part 210 and a rearward frame part 220, which connect longitudinal ends of the rightward upper frame part 190 and the leftward upper frame part 200. In this arrangement, the upper frame member 104 forms a four-sided frame in a plan view. The upper frame member 104 is larger than the lower frame member 103 and has a size, in which the lower frame member 103 is accommodable.

The rightward upper frame part 190 is a piece formed by bending a steel plate. The rightward upper frame part 190 is in an arrangement such that a direction of thickness thereof coincides with the crosswise direction. The rightward upper frame part 190 includes a side plate 192, an upper plate 193, and a lower plate 194. The side plate 192 has a rectangular shape elongated in the front-rear direction, and the upper plate 193 and the lower plate 194 extend rightward in planes from an upper edge and a lower edge, respectively, of the side plate 192. The elongated members 120, 130 in the rightward link member 101 are arranged at a leftward position with respect to the side plate 192. The rightward upper frame part 190 is longer than the rightward lower frame part 160 of the lower frame member 103. The leftward upper frame part 200 is in a substantially same configuration as the rightward upper frame part 190 and is paired with the rightward upper frame part 190. The leftward upper frame part 200 is arranged at a leftward position with respect to the rightward upper frame part 190 to face the rightward upper frame part 190. The leftward upper frame part 200 is a piece formed by bending a steel plate. The leftward upper frame part 200 is in an arrangement such that a direction of thickness thereof coincides with the crosswise direction. The leftward upper frame part 200 includes a side plate 202, an upper plate 203, and a lower plate 204. The side plate 202 has a rectangular shape elongated in the front-rear direction, and the upper plate 203 and the lower plate 204 extend leftward in planes from an upper edge and a lower edge, respectively, of the side plate 202. The elongated members 140, 150 in the leftward link member 102 are arranged at a leftward position with respect to the side plate 202. The leftward upper frame part 200 has a length equal to a length of the rightward upper frame part 190 and is longer than the leftward lower frame part 170 of the lower frame member 103.

The frontward frame part 210 is a piece formed by bending a steel plate into a cross-sectional shape of an L. The frontward frame part 210 includes a frontward plate 212 and a lower plate 213. The frontward frame part 210 is in an arrangement such that a direction of thickness of the frontward plate 212 coincides with the front-rear direction, and a direction of thickness of the lower plate 213 coincides with the vertical direction. The lower plate 213 extends in a plane rearward from a lower edge of the frontward plate 212. The frontward frame part 210 is in an arrangement such that a rightward end of the lower plate 213 is located on a lower side of the lower plate 194 in a frontward end area of the rightward upper frame part 190 and is fixed to the lower plate 194 with a screw. Moreover, the frontward frame part 210 is in an arrangement such that a leftward end of the lower plate 213 is located on a lower side of the lower plate 204 in a frontward end area of the leftward upper frame part 200 and is fixed to the lower plate 204 with a screw. The rearward frame part 220 is a piece formed by bending a steel plate into a cross-sectional shape of an L. The rearward frame part 220 includes a rearward plate 222 and an upper plate 223. The rearward frame part 220 is in an arrangement such that a direction of thickness of the rearward plate 222 coincides with the front-rear direction, and a direction of thickness of the upper plate 223 coincides with the vertical direction. The upper plate 223 extends in a plane frontward from an upper edge of the rearward plate 222. The rearward frame part 220 is in an arrangement such that a rightward end of the upper plate 223 is located on an upper side of the upper plate 193 in a rearward end area of the rightward upper frame part 190 and is fixed to the upper plate 193 with a screw. Moreover, the rearward frame part 220 is in an arrangement such that a leftward end of the upper plate 223 is located on an upper side of the upper plate 203 in a rearward end area of the leftward upper frame part 200 and is fixed to the upper plate 203 with a screw.

The side plate 192 of the rightward upper frame part 190 and the side plate 202 of the leftward upper frame part 200 have round-shaped supporting holes 195, 205, respectively, in respective rearward end areas. The supporting holes 195, 205 support one and the other longitudinal ends of a supporting shaft 115 being a round rod, which extends in the crosswise direction, rotatably. The elongated member 130 of the rightward link member 101 retains the supporting shaft 115 rotatably at the rearward end portion 133 thereof on a leftward side of the supporting hole 195. The elongated member 150 of the leftward link member 102 retains the supporting shaft 115 rotatably at the rearward end portion 153 thereof on a rightward side of the supporting hole 205. Thus, the elongated member 130 and the elongated member 150 are pivotable with respect to the rearward end area of the rightward upper frame part 190 and the rearward end area of the leftward upper frame part 200, respectively.

The side plate 192 of the rightward upper frame part 190 and the side plate 202 of the leftward upper frame part 200 have ellipse-shaped guiding holes 196, 206, which are elongated in the front-rear direction, respectively, in respective frontward end areas. Through the guiding holes 196, 206, a guiding shaft 116 being a round rod, which extends in the crosswise direction, is inserted. The guiding shaft 116 is movable in the front-rear direction along the guiding holes 196, 206 and is rotatably supported by the guiding holes 196, 206. The elongated member 120 of the rightward link member 101 retains the guiding shaft 116 rotatably at the frontward end portion 124 thereof on a leftward side of the guiding hole 196. The elongated member 140 of the leftward link member 102 retains the guiding shaft 116 rotatably at the frontward end portion 144 thereof on a rightward side of the guiding hole 206. Thus, the elongated member 120 and the elongated member 140 are pivotable and movable in the front-rear direction with respect to the frontward end area of the rightward upper frame part 190 and the frontward end area of the leftward upper frame part 200, respectively.

The rightward upper frame part 190 and the leftward upper frame part 200 are formed by bending steel plates to secure rigidity against an external bending force. The frontward frame part 210 and the rearward frame part 220 may hold the longitudinal ends of the rightward upper frame part 190 and the leftward upper frame part 200 to locate the rightward upper frame part 190 and the leftward upper frame part 200 at correct positions with respect each other. Thus, the upper frame member 104 may be sufficiently rigid against bending forces in the vertical direction and the crosswise direction.

Positional relation between the lower frame member 103 and the upper frame member 104 may be secured by the rightward link member 101 and the leftward link member 102. Rigidity of the rightward link member 101 and the leftward link member 102 may be ensured by the coupling shafts 111, 112 coupling the elongated members 120, 140 with the elongated members 130, 150, respectively, and by the supporting shafts 113, 115 and the guiding shafts 114, 116, which locate the rearward end portions 123, 143 of the elongated members 120, 140, the rearward end portions 133, 153 of the elongated members 130, 150, the frontward end portions 134, 154 of the elongated members 130, 150, and the frontward end portions 124, 144 of the elongated members 120, 140, at the predetermined positions. The lower frame member 103 and the upper frame member 104 support the supporting shafts 113, 115 through the supporting holes 165, 175 and the supporting holes 195, 205, respectively. The lower frame member 103 and the upper frame member 104 restrict the guiding shafts 114, 116 from moving in the vertical direction by the guiding holes 166, 176 and the guiding holes 196, 206, respectively. Thus, rigidity of the lower frame member 103 and the upper frame member 104 against a bending force in the vertical direction may be sufficiently ensured by the rightward link member 101 and the leftward link member 102.

Figure 5:
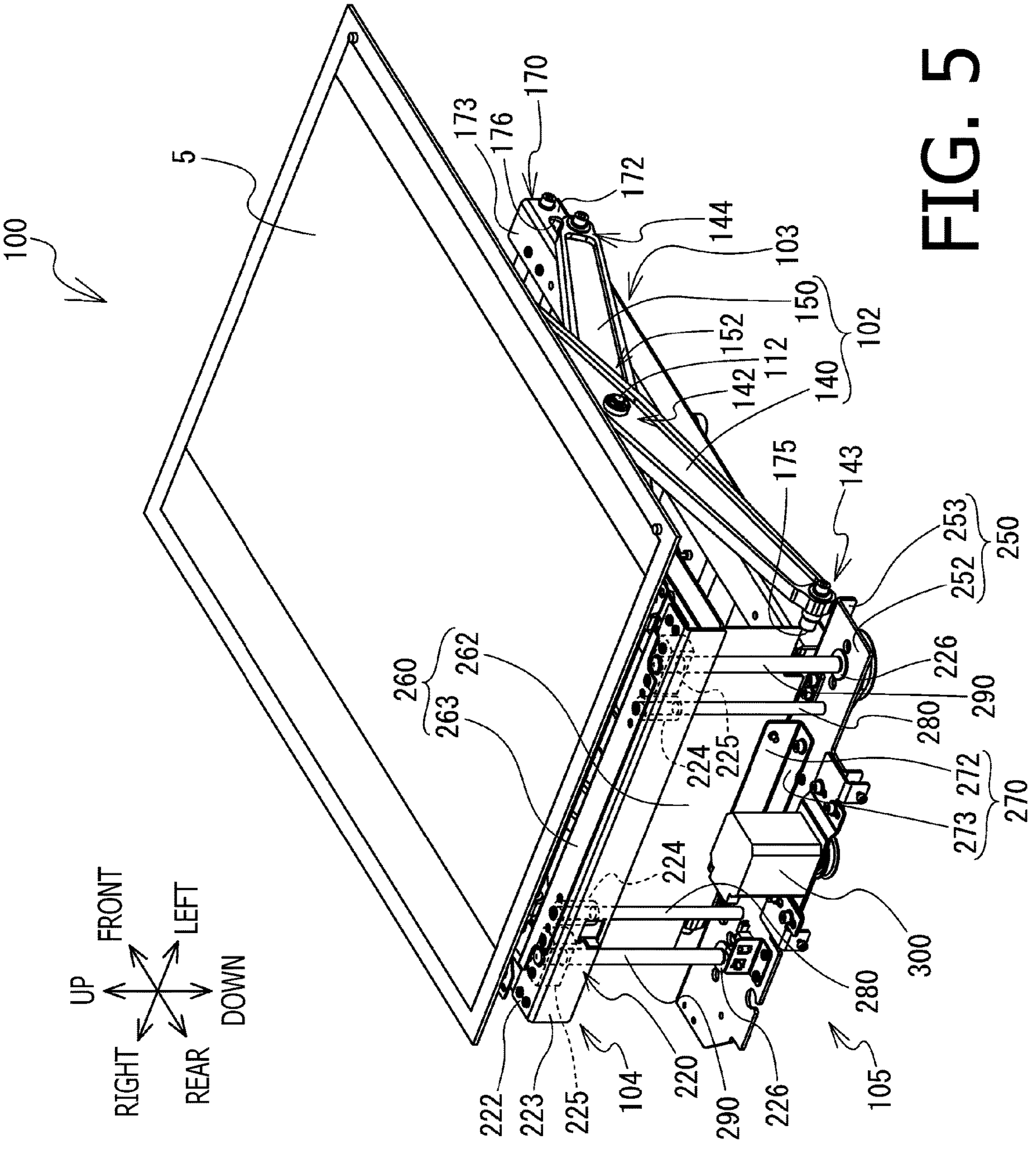
FIG. 5 is a perspective view of the lift assembly 100 with the platen 5 mounted thereon, viewed from an upper left-and-rearward position, according to the embodiment of the present disclosure.

As shown in FIG. 5, the driving device 105 is located at a rearward area in the lift assembly 100. The driving device 105 includes a lower plate member 250, a frontward plate member 260, a coupling member 270, linear shafts 280, trapezoidal threads 290, and a driving motor 300.

As shown in FIG. 5, the lower plate member 250 is a piece formed by bending a steel plate. The lower plate member 250 is in an arrangement such that a direction of thickness thereof coincides with the vertical direction. The lower plate member 250 includes a lower supporting part 252, which is a planar part extending in the crosswise direction, and a lower bent part 253, which is another part of the lower plate member 250 formed by bending downward at a frontward edge of the lower supporting part 252. A length of the lower plate member 250 in the crosswise direction is substantially greater than a length of the lower frame member 103 in the crosswise direction. The lower supporting part 252 is coupled to the rightward lower frame part 160 and the leftward lower frame part 170 through two clasps 107. In particular, the clasps 117 couple an upper surface in a frontward end area of the lower supporting part 252 to an upper surface in a rearward end area of the upper plate 163 of the rightward lower frame part 160 and to an upper surface in a rearward end area of the upper plate 173 of the leftward lower frame part 170. As shown in FIGS. 3-4, the lower bent part 253 is arranged to contact a rearward end of the rearward bridge part 182 of the lower frame member 103 at a lower-front end thereof.

As shown in FIG. 5, the frontward plate member 260 is a piece formed by bending a steel plate. The frontward plate member 260 is in an arrangement such that a direction of thickness thereof coincides with the front-rear direction. The frontward plate member 260 includes a frontward supporting part 262, which is a planar part extending in the crosswise direction, and a rearward bent part 263, which is another part of the frontward plate member 260 formed by bending rearward at an upper edge of the frontward supporting part 262. A length of the frontward plate member 260 in the crosswise direction is substantially smaller than a length of the lower frame member 103 in the crosswise direction. A downward surface of the rearward bent part 263 faces toward an upper surface of the lower supporting part 252. Rearward corners at ends of the rearward bent part 263 in the crosswise direction are cut off in curves.

As shown in FIG. 5, the coupling member 270 is a piece formed by bending a steel plate into a cross-sectional shape of an L. The coupling member 270 includes a frontward coupling plate 272, which is a planar part extending in the crosswise direction, and a lower coupling plate 273, which is another part of the coupling member 270 formed by bending rearward at a lower edge of the frontward coupling plate 272. The coupling member 270 is in an arrangement such that a direction of thickness of the frontward coupling plate 272 coincides with the front-rear direction. A length of the coupling member 270 in the crosswise direction is substantially smaller than a length of the frontward plate member 260 in the crosswise direction. The frontward coupling plate 272 is located at a position rearward from a lower end of the frontward supporting part 262 of the frontward plate member 260 and is fixed to the frontward supporting part 262 with screws. The lower coupling plate 273 is located on an upper side in a frontward end area of the lower supporting part 252 of the lower plate member 250 and is fixed to the lower supporting part 252 with screws. The lower plate member 250 and the frontward plate member 260 are coupled with each other through the coupling member 270.

The linear shafts 280 are a pair of round steel rods for guiding the upper frame member 104 to move in the vertical direction. The linear shafts 280 are located at positions on outer sides of the coupling member 270 in the crosswise direction and extend in the vertical direction. Upper ends of the linear shafts 280 are fastened to the rearward bent part 263 of the frontward plate member 260 with the screws. Lower ends of the linear shafts 280 are fastened to the lower supporting part 252 of the lower plate member 250 with the screws. The rearward frame part 220 in the upper frame member 104 has linear guides 224, by which the upper frame member 104 are guided along the linear shafts 280. The linear guides 224 are attached to a lower side of the upper plate 223 and may retain the linear shafts 280 when the upper frame member 104 moves in the vertical direction to locate the upper frame member 104 at a correct position with respect to the driving device 105.

The trapezoidal threads 290 are threaded-rod members, each of which has a thread in a trapezoidal form, longitudinally extending in the vertical direction. The trapezoidal threads 290 are used as feed screws to transmit the driving force to move the upper frame member 104 in the vertical direction. The trapezoidal threads 290 are paired and located at positions on outer sides of the pair of linear shafts 280 in the crosswise direction. Lower ends of the trapezoidal threads 290 are supported by bearings 226, which are attached to the lower supporting part 252 of the lower plate member 250, rotatably. The rearward frame part 220 of the upper frame member 104 has engagement parts 225, in which female threads to mesh with the trapezoidal threads 290 are formed. The engagement parts 225 are attached to a downward face of the upper plate 223 at positions on outer sides of the paired linear guides 224 in the crosswise direction. As the trapezoidal threads 290 rotate, the driving force may be transmitted to the engagement parts 225, and the upper frame member 104 may move in the vertical direction.

Figure 6:
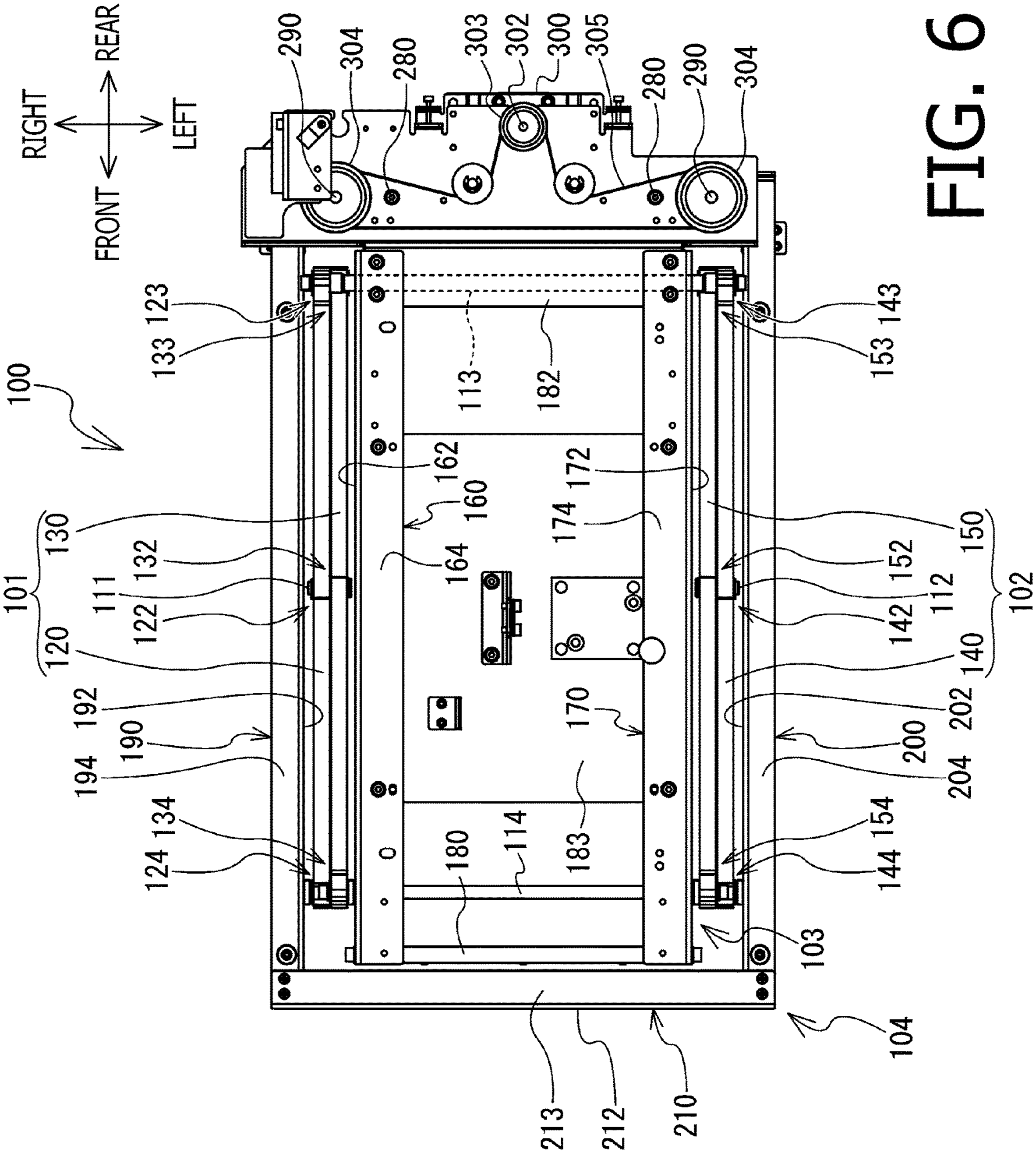
FIG. 6 is a bottom plan view of the lift assembly 100 according to the embodiment of the present disclosure.
Figure 7:
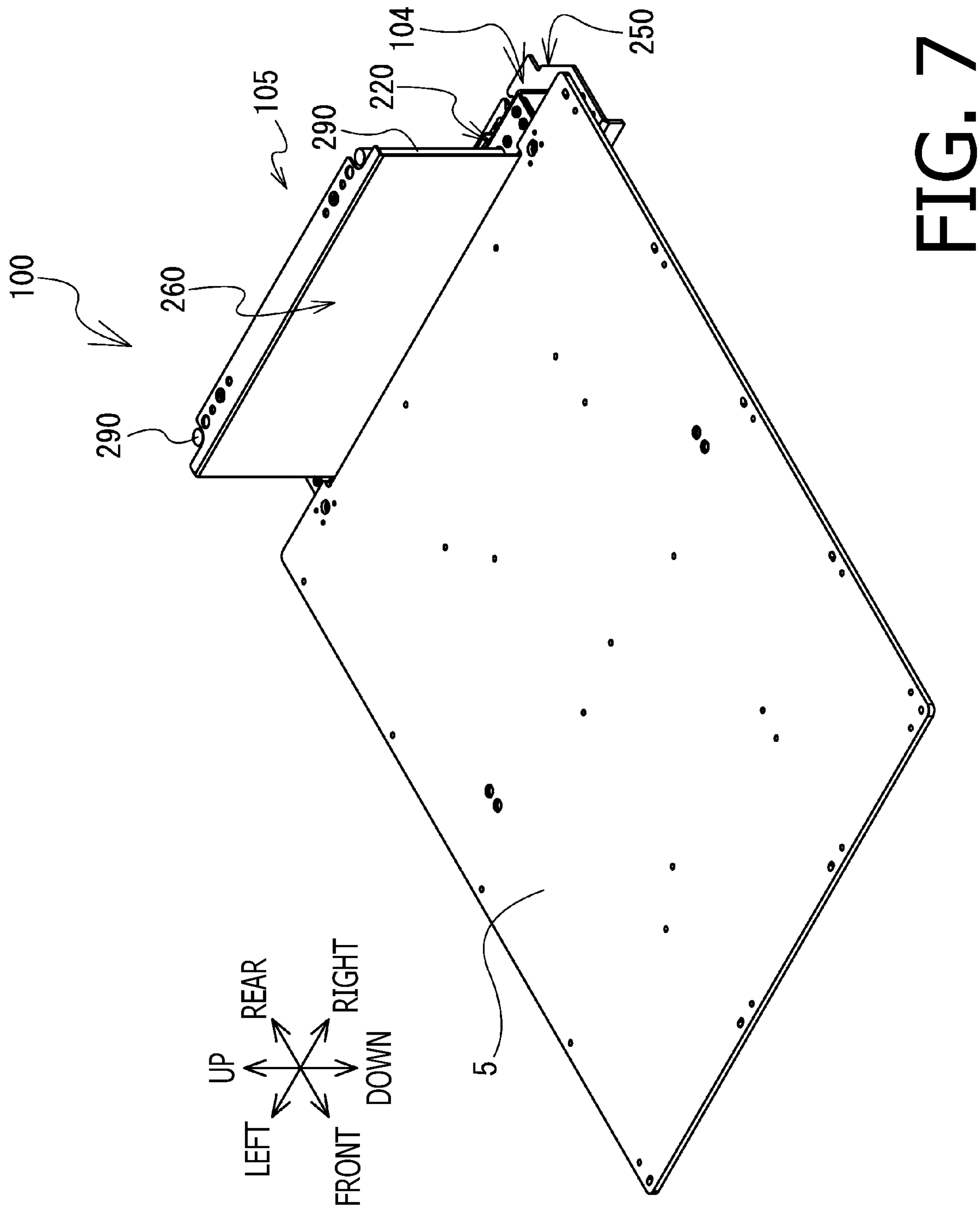
FIG. 7 is a perspective view of the lift assembly 100, viewed from an upper right-and-frontward position, with the platen 5 lowered to a lowermost position, according to the embodiment of the present disclosure.
Figure 8:
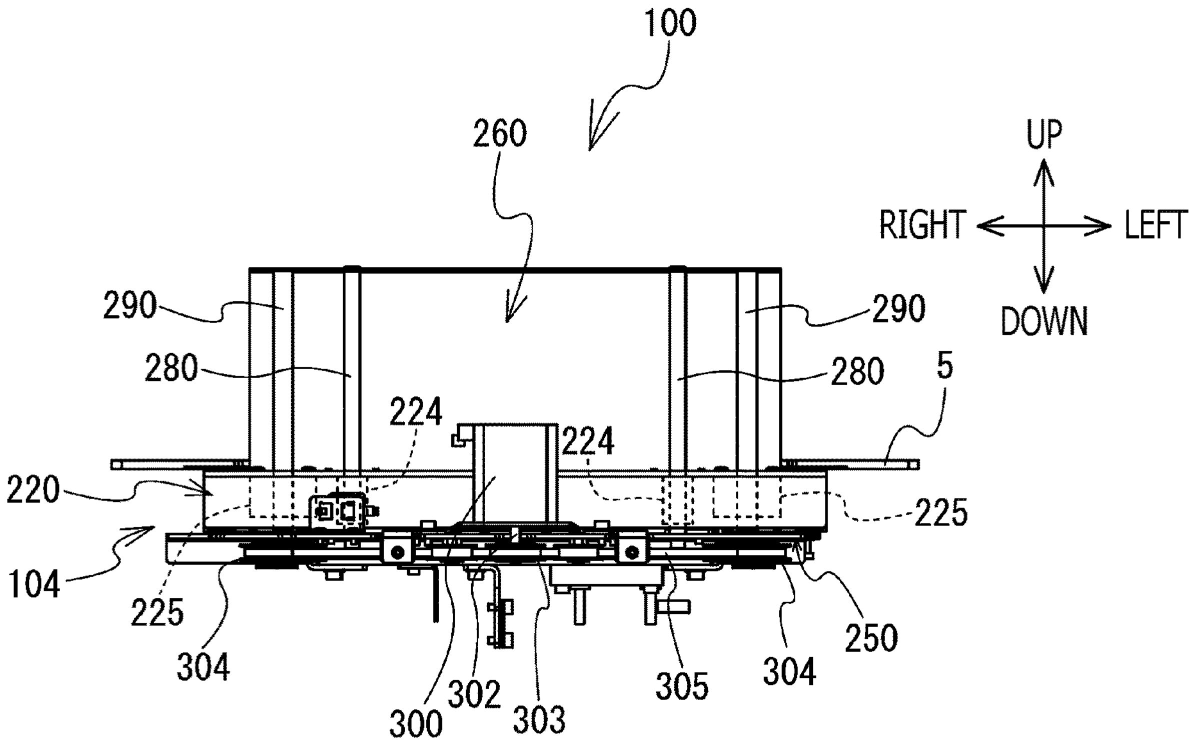
FIG. 8 is a rearward view of the lift assembly 100 with the platen 5 lowered to the lowermost position, according to the embodiment of the present disclosure.

The driving motor 30 is a driving source to supply the driving force for rotation of the trapezoidal threads 290. The driving motor 300 is located at a position rearward from the coupling member 270 on the lower supporting part 252 of the lower plate member 250. As shown in FIG. 6, a driving shaft 302 of the driving motor 300 protrudes downward from the lower supporting part 252, and a pulley 303 is attached to the driving shaft 302. Meanwhile, to each lower end of the trapezoidal threads 290, a pulley 304 is attached. Around the pulley 303 and the two pulleys 304, a belt 305 is strained. Thus, the driving force generated by rotation of the driving shaft 302 may be transmitted to the trapezoidal threads 290 through the pulley 303, 304 and the belt 305.

Rigidity of the lower plate member 250 against a bending force in the crosswise direction may be sufficiently ensured by the lower bent part 253 bent at the frontward edge of the lower plate member 250. Similarly, rigidity of the frontward plate member 260 against a bending force in the crosswise direction may be sufficiently ensured by the rearward bent part 263 bent at the frontward edge of the frontward plate member 260. Moreover, the linear shafts 280 connecting the lower supporting part 252 of the lower plate member 250 and the rearward bent part 263 of the frontward plate member 260 in the vertical direction may ensure rigidity of the frontward plate member 260 against a bending force in the front-rear direction.

With reference to FIGS. 6-9, behaviors of the lift assembly 100 will be described. For moving the platen 5 to ascend or descend, the driving motor 300 may be activated to rotate the driving shaft 302. When the platen 5 descends, the pulley 303 connected with the driving shaft 302 may rotate, and the belt 305 strained around the pulleys 303, 304 may circulate and rotate the pulleys 304 and the trapezoidal threads 290 connected with the pulleys 304. The trapezoidal threads 290 may move the engagement parts 225 on the rearward frame part 220 downward to lower the upper frame member 104. Thereby, the upper frame member 104 and the platen 5 may be lowered to the position shown in FIGS. 7-9.

The rightward link member 101 and the leftward link member 102 may contract the elongated members 120, 130 and the elongated members 140, 150, respectively, in the vertical direction and expand the elongated members 120, 130 and the elongated members 140, 150 in the front-rear direction. The supporting shaft 113 retained by the rearward end portions 123, 143 of the elongated members 120, 140, respectively, is supported by the supporting holes 165, 175, in the rearward end area of the lower frame member 103. On the other hand, the guiding shaft 116 retained by the frontward end portions 124, 144 of the elongated members 120, 140, respectively, are supported by the guiding holes 196, 206 in the frontward end area of the upper frame member 104 movably in the front-rear direction. The guiding shafts 114 retained by the frontward end portions 134, 154 of the elongated members 130, 150, respectively, is supported by the guiding holes 166, 176 in the frontward end area of the lower frame member 103 movably in the front-rear direction. Therefore, the rightward link member 101 and the leftward link member 102 may contract in the vertical direction while the positional relation between the rearward end portions 133, 153 of the elongated members 130, 150 and the frontward end portions 124, 144 of the elongated members 120, 140 in the vertical direction is maintained. Thus, the upper frame member 104 may descend, while the positional relation with the lower frame member 103 in the front-rear direction and the crosswise direction is maintained, without tilting the platen 5.

Figure 9:
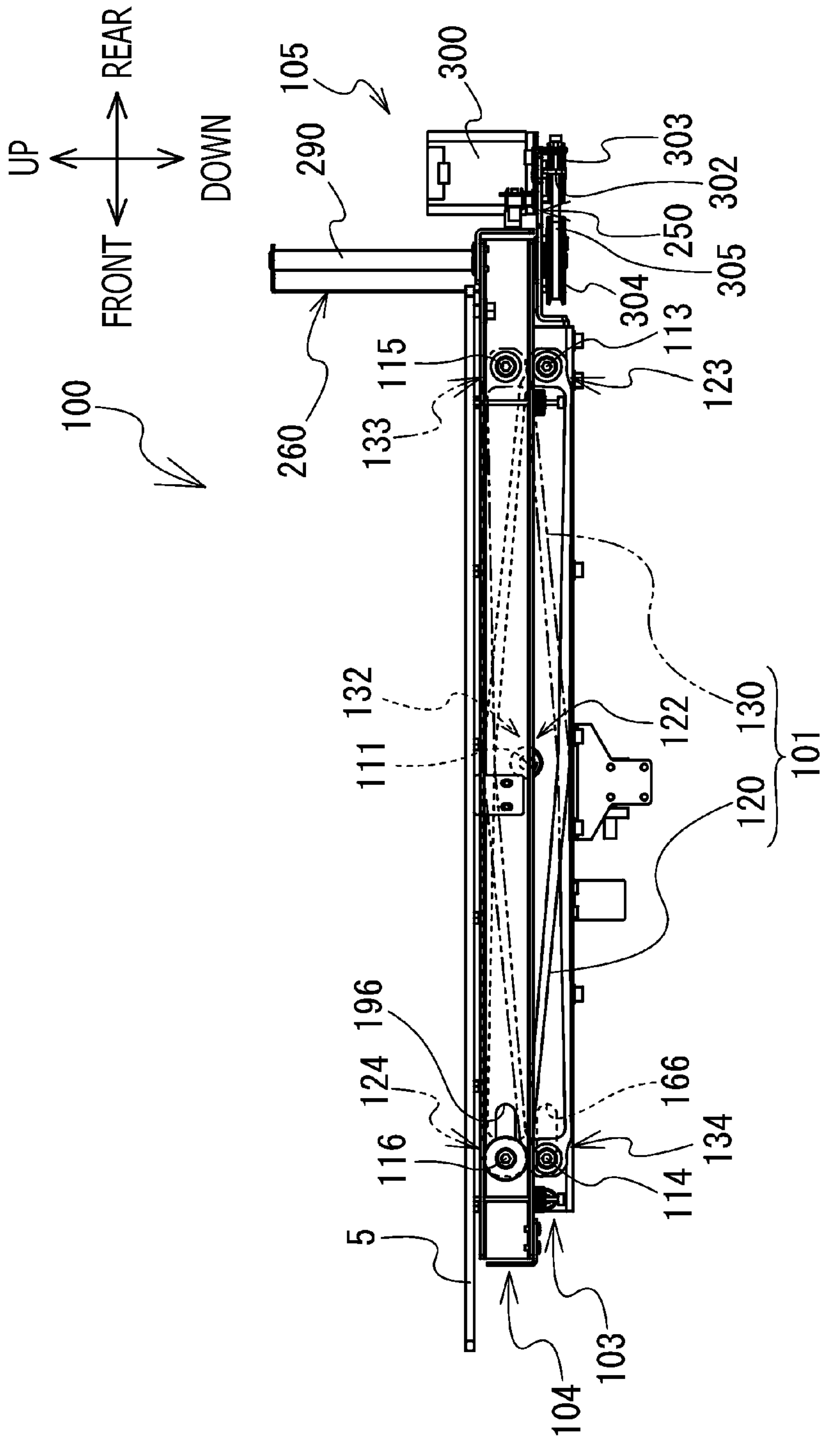
FIG. 9 is a rightward side view of the lift assembly 100, with the platen 5 lowered to the lowermost position, according to the embodiment of the present disclosure.

When the upper frame member 104 is lowered to the lowermost position, as shown in FIG. 9, the rightward link member 101 may have the frontward and rearward end portions 124, 123 of the elongated member 120 and the frontward and rearward end portions 134, 133 of the elongated member 130 to approach closer to each other in the vertical direction compared to a structure, in which the frontward and rearward end portions of the elongated members 120, 130 are not tapered but are in the same width as the central areas 122, 132 of the elongated members 120, 130. As described above, the elongated members 120, 130 of the rightward link member 101 are tapered to have smaller width toward the longitudinal ends thereof. Therefore, a cause that may increase a closest distance between the elongated members 120, 130 of the rightward link member 101 due to conflicts between the supporting shafts 113, 115, the guiding shafts 114, 116 and the longitudinal ends of the elongated members 120, 130 when the longitudinal ends of the elongated members 120, 130 approach closer to each other in the vertical direction may be reduced. Moreover, the leftward link member 102 has the same configuration as the rightward link member 101. Therefore, the lift assembly 100 may lower the upper frame member 104 to a lower position compared to the conventional configuration.

For moving the platen 5 to ascend, the driving motor 300 may rotate the driving shaft 302 in a direction reversed from the rotation to lower the platen 5. The trapezoidal threads 290 may rotate in a direction reversed from the rotation to lower the platen 5 to move the engagement parts 225 of the rearward frame part 220 upward, and thereby the upper frame member 104 may ascend. The rightward link member 101 and the leftward link member 102 may expand in the vertical direction while the positional relation between the rearward end portions 133, 153 of the elongated members 130, 150 and the frontward end portions 124, 144 of the elongated members 120, 140 in the vertical direction is maintained, similarly to the behavior of the lift assembly 100 when the platen 5 is lowered. Thus, the upper frame member 104 may ascend, while the positional relation with the lower frame member 103 in the front-rear direction and the crosswise direction is maintained, without tilting the platen 5.

As described above, the lift assembly 100 may move the upper frame member 104 and the platen 5 through the rotation of the trapezoidal threads 290 without directly applying a force to the rightward link member 101 or the leftward link member 102. The rightward link member 101 and the leftward link member 102 may expand or contract submissively according to the positional relation in the vertical direction between the lower frame member 103 and the upper frame member 104 and, at the same time, may support the upper frame member 104 against the lower frame member 103. Therefore, the lift assembly 100 may reduce the load on the trapezoidal threads 290 compared to the configuration, in which the force to contract or expand the rightward link member 101 and the leftward link member 102 is directly applied to the rightward link member 101 and the leftward link member 102.

When the rightward link member 101 and the leftward link member 102 contract, the longitudinal end portions 123, 124 and 133, 134 of the elongated members 120, 130 and the longitudinal end portions 143, 144 and 153, 154 of the elongated members 140, 150 may approach closer to each other, respectively, in the vertical direction compared to the structure, in which the longitudinal ends of the elongated members 120, 130, 140, 150 are not tapered but are in the same width as the central area of the elongated members 120, 130, 140, 150. Therefore, the lift assembly 100 may increase a movable distance of the platen 5 without lengthening the elongated members 120, 130, 140, 150.

The supporting holes 195, 205 and the engageable parts 255 are arranged at the rearward positions in the upper frame member 104. The supporting holes 195, 205 are movable in the vertical direction with respect to the supporting holes 165, 175 by the movement of the rightward link member 101 and the leftward link member 102 but are limited in moving in the crosswise direction or the front-rear direction. Meanwhile, the upper frame member 104 is movable in the vertical direction by the movement of the trapezoidal threads 290 but are limited in moving in the crosswise direction or the front-rear direction. Therefore, with the rightward link member 101, the leftward link member 102, and the trapezoidal threads 290, rigidity of the upper frame member 104 in the rearward area may be ensured.

The supporting holes 195, 205 and the linear guides 224 are arranged at the rearward positions in the upper frame member 104. The supporting holes 195, 205 are movable in the vertical direction with respect to the supporting holes 165, 175 by the movement of the rightward link member 101 and the leftward link member 102 but are limited in moving in the crosswise direction or the front-rear direction. Meanwhile, the upper frame member 104 is movable in the vertical direction by the aid of the linear shafts 280 but are limited in moving in the crosswise direction or the front-rear direction. Therefore, with the rightward link member 101, the leftward link member 102, and the linear shafts 280, rigidity of the upper frame member 104 in the rearward area may be ensured.

The lower plate member 250 and the frontward plate member 260 may be placed at the correct positions with respect to each other by being coupled through the coupling member 270 and by retaining the longitudinal ends of the linear shafts 280. Thus, rigidity of the linear shafts 280 may be ensured. Therefore, with the upper frame member 104 retaining the linear shafts 280 through the linear guides 224, the lift assembly 100 may ensure the rigidity of the upper frame member 104 in the rearward area.

The trapezoidal threads 290 are supported by the lower plate member 250 having the bearings 226. The lower plate member 250 is connected to the lower frame member 103. Therefore, the lift assembly 100 may move the upper frame member 104 and the platen 5 in the vertical direction with respect to the lower frame member 103 through the trapezoidal threads 290.

The driving motor 300 is located at the position in the vicinity of the trapezoidal threads 290. Therefore, potential loss of the driving force in transmission may be reduced, and the load on the driving motor 300 for moving the platen 5 may be reduced.

The lower frame member 103, the upper frame member 104, the rightward link member 101, and the leftward link member 102 are coupled to one another through the engagement between the supporting shafts 113, 115 and the supporting holes 165, 175, 195, 205, and the engagement between the guiding shafts 114, 116 and the guiding holes 166, 176, 196, 206. Thus, the configuration of the lift assembly 100 may be simplified, and the manufacturing cost may be reduced.

The lift assembly 100 has the upper frame member 104, which includes at least the rearward frame part 220, the rightward upper frame part 190, and the leftward upper frame part 200, to ensure the rigidity to support the platen 5. Moreover, weight of the lift assembly 100 may be reduced by using the upper frame member 104 as a minimum framework; therefore, potential load on the trapezoidal threads 290 may be reduced. Further, by using the trapezoidal threads 290, of which threads are in the trapezoidal form, potential loads on the trapezoidal threads 290 when moving the platen 5 in the vertical direction may be reduced while the platen 5 may be moved finely.

The printer 1 according to the present embodiment may reduce the potential load on the driving motor 300, which may be caused by overload on the platen 5. Moreover, with the lift assembly 100 with the enhanced rigidity, a life span of the printer 1 may be extended, and instability of the printable object on the platen 5 while the platen 5 moves may be reduced.

The printer 1 may move the platen 5 through the lift assembly 100 to a preferable vertical position with respect to the heads 10A, 10B to print an image even when, for example, a vertical position of the printable object varies, and instability of the printable object on the platen 5 while the platen 5 moves may be reduced.

Although an example of carrying out the invention has been described, those skilled in the art will appreciate that there are numerous variations and permutations of the movable assembly and the printing apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters. The embodiment described above and modified examples described below may optionally be combined as long as they may coexist without conflicting. For example, the present disclosure may not necessarily be applied to the UV inkjet printer but may be applied to a printer in a different type.

For another example, the elongated members 120, 130, 140, 150 may not necessarily tapered from the longitudinal center toward the longitudinal ends but may be elongated at a constant width from the longitudinal center to the longitudinal ends. For another example, at least one of the elongated members 120, 130, 140, 150 may be elongated at a constant width from the longitudinal center to the longitudinal ends. For another example, the elongated members 120, 130, 140, 150 may be tapered from the longitudinal center toward one of the longitudinal ends, and the other longitudinal end may extend at constant width from the longitudinal center.

For another example, the elongated members 120, 140 and the elongated members 130, 150 may not necessarily retain the supporting shafts 113, 115 extending in the crosswise direction at the rearward end portions 123, 143 and the rearward end portions 133, 153, respectively, but the elongated members 120, 140 and the elongated members 130, 150 may have pins protruding from the rearward end portions 123, 143 and the rearward end portions 133, 153, which may be rotatably supported by the supporting holes 165, 175 and the supporting holes 195, 205, respectively. Similarly, the elongated members 130, 150 and the elongated members 120, 140 may not necessarily retain the guiding shafts 114, 116 extending in the crosswise direction at the frontward end portions 134, 154 and the frontward end portions 124, 144, respectively, but the elongated members 130, 150 and the elongated members 120, 140 may have pins protruding from the frontward end portions 134, 154 and the frontward end portions 124, 144, which may be supported by the guiding holes 166, 176 and the guiding holes 196, 206, respectively, rotatably and movably in the front-rear direction. For another example, in place of the guiding holes, slidable rails and sliders that may slide in the front-rear direction may be arranged. In this arrangement, the sliders and the frontward end portions 124, 134, 144, 154 may be pivotably engaged with each other through pins and bearings.

For another example, the upper frame member 104 may not necessarily have the frontward frame part 210, but the frontward frame part 210 may be omitted from the upper frame member 104 to reduce the weight of the upper frame member 104. Additionally, or alternatively, the engagement parts 225 to mesh with the trapezoidal threads 290 may be arranged in a rearward area of the rightward upper frame part 190 and a rearward area of the leftward upper frame part 200, and the rearward frame part 220 may be omitted to reduce the weight of the upper frame member 104. For another example, the platen 5 may not necessarily be detachably attached on top of the upper frame member 104, but the upper frame member 104 may be formed integrally with the platen 5 to reduce the weight of the lift assembly 100. Moreover, the lower frame member 103 may be in a configuration such that the rearward bridge part 182 is formed integrally with the lower plate member 250 of the driving device 105 so that the lower frame member 103 and the rearward bridge part 182 are unified. For another example, the quantity of the trapezoidal threads 290 in the driving device 105 may not necessarily be limited to two but may be one, three, or more. For another example, the linear shafts 280 may not necessarily be the round rods but may be bars having a rectangular or trapezoidal cross section.

For another example, the driving device 105 may not necessarily transmit the driving force from the driving motor 300 to the trapezoidal threads 290 through the pulleys 303, 304 but may transmit the driving force through gears such as rack gear, pinion gear, etc. For another example, when the quantity of the trapezoidal thread 290 is one, the driving shaft 302 of the driving motor 300 may be coupled to the trapezoidal thread 290. In this arrangement, the pulleys 303, 304, and the belt 305 may be omitted, and a number of parts in the lift assembly 100 may be reduced.

For another example, the trapezoidal threads 290 may be replaced with triangular threads, rectangular threads, ball screws.

What is claimed is:

1. A movable assembly configured to move a table in a first direction, comprising:

a first link member including a first elongated member and a second elongated member coupled in an X formation pivotably with respect to each other, the first link member being expandable and contractable in the first direction;

a second link member including a third elongated member and a fourth elongated member coupled in the X formation pivotably with respect to each other, the second link member being expandable and contractable in the first direction, the third elongated member being arranged to face the first elongated member in a second direction, the second direction intersecting with the first direction, the fourth elongated member being arranged to face the second elongated member in the second direction;

a first frame member, on which one end, in the first direction, of the first link member and one end, in the first direction, of the second link member are located;

a second frame member, on which the other end, in the first direction, of the first link member and the other end, in the first direction, of the second link member are located, the second frame member supporting the table thereon, the table being positioned opposite to the first frame member with respect to the second frame member in the first direction, the second frame member including an engagement part; and a rotatable member being a threaded rod, the rotatable member being engaged with the engagement part, the rotatable member being configured to move the second frame member and the table in the first direction by its rotation, wherein the first frame member includes:

a first supporting portion supporting one end, in a third direction, of the first elongated member in the first link member and one end, in the third direction, of the third elongated member rotatably, the third direction intersecting with the first direction and the second direction; and a first guiding portion supporting one end, in the third direction, of the second elongated member in the first link member and one end, in the third direction, of the fourth elongated member in the second link member movably in the third direction, wherein the second frame member includes:

a second supporting portion supporting the other end, in the third direction, of the second elongated member in the first link member and the other end, in the third direction, of the fourth elongated member in the second link member rotatably; and a second guiding portion supporting the other end, in the third direction, of the first elongated member in the first link member and the other end, in the third direction, of the third elongated member in the second link member movably in the third direction.

2. The movable assembly according to claim 1, wherein each of the first elongated member and the second elongated member in the first link member and each of the third elongated member and the fourth elongated member in the second link member has a tapered shape, in which a width thereof is reduced from a lengthwise center toward each lengthwise end.

3. The movable assembly according to claim 1, wherein the engagement part is arranged at one end, in the third direction, of the second frame member closer to the first supporting portion and the second supporting portion than the first guiding portion and the second guiding portion in the third direction.

4. The movable assembly according to claim 1, further comprising:

an extending member extending in the first direction; and a guiding member arranged at one end, in the third direction, of the second frame member closer to the first supporting portion and the second supporting portion than the first guiding portion and the second guiding portion in the third direction, the guiding member being configured to retain the extending member and guide the extending member moving in the first direction relatively to the guiding member.

5. The movable assembly according to claim 4, further comprising:

a first plate member connected to the first frame member at one end, in the third direction, of the first frame member closer to the first supporting portion and the second supporting portion than the first guiding portion and the second guiding portion in the third direction, the first plate member being a plate spreading in the second direction and the third direction, the first plate member retaining one end, in the first direction, of the extending member;

a second plate member connected to the second frame member at the other end, in the third direction, of the second frame member, the second plate member being a plate spreading in the first direction and the second direction, the second plate member including a bent part, the bent part being a part of the second plate member located at one end, in the first direction, of the second plate member closer to the table than the first frame member and bent toward the one end, in the third direction, of the second frame member, the bent part retaining the other end, in the first direction, of the extending member: and a third plate member being a bent plate, the third plate member connecting the first plate member and the second plate member.

6. The movable assembly according to claim 5, wherein the first plate member includes a bearing, the bearing supporting the rotatable member rotatably.

7. The movable assembly according to claim 5, further comprising a driving device arranged on the first plate member, the driving device being configured to apply a driving force for rotation to the rotatable member.

8. The movable assembly according to claim 1, further comprising a first shaft member, a second shaft member, a third shaft member, and a fourth shaft member, each of which is a rod extending in the second direction, wherein the first supporting portion and the second supporting portion are round holes engaged with the first shaft member and the second shaft member, respectively, and wherein the first guiding portion and the second guiding portion are elongated holes engaged with the third shaft member and the fourth shaft member, respectively.

9. The movable assembly according to claim 1, wherein the second frame member includes at least:

a first frame part extending in the second direction, the first frame part having the engagement part engaged with the rotatable member;

a pair of second frame parts, one and the other of which extend from one and the other ends of the first frame part in the second direction, respectively, in the third direction extending away from the engagement part, each of the pair of second frame parts having the second supporting portion and the second guiding portion.

10. The movable assembly according to claim 1, wherein the rotatable member is a trapezoidal thread, of which thread is in a trapezoidal form.

11. A printing apparatus, comprising:

a movable assembly configured to move a table in a first direction, the movable assembly comprising:

a first link member including a first elongated member and a second elongated member coupled in an X formation pivotably with respect to each other, the first link member being expandable and contractable in the first direction;

a second link member including a third elongated member and a fourth elongated member coupled in the X formation pivotably with respect to each other, the second link member being expandable and contractable in the first direction, the third elongated member being arranged to face the first elongated member in a second direction, the second direction intersecting with the first direction, the fourth elongated member being arranged to face the second elongated member in the second direction;

a first frame member, on which one end, in the first direction, of the first link member and one end, in the first direction, of the second link member are located;

a second frame member, on which the other end, in the first direction, of the first link member and the other end, in the first direction, of the second link member are located, the second frame member supporting the table thereon, the table being positioned opposite to the first frame member with respect to the second frame member in the first direction, the second frame member including an engagement part; and a rotatable member being a threaded rod, the rotatable member being engaged with the engagement part, the rotatable member being configured to move the second frame member and the table in the first direction by its rotation; and a head configured to discharge ink at a printable object placed on the table in the movable assembly, wherein the first frame member includes:

a first supporting portion supporting one end, in a third direction, of the first elongated member in the first link member and one end, in the third direction, of the third elongated member in the second link member rotatably, the third direction intersecting with the first direction and the second direction; and a first guiding portion supporting one end, in the third direction, of the second elongated member in the first link member and one end, in the third direction, of the fourth elongated member in the second link member movably in the third direction, wherein the second frame member includes:

a second supporting portion supporting the other end, in the third direction, of the second elongated member in the first link member and the other end, in the third direction, of the fourth elongated member in the second link member rotatably; and a second guiding portion supporting the other end, in the third direction, of the first elongated member in the first link member and the other end, in the third direction, of the third elongated member in the second link member movably in the third direction.

12. The printing apparatus according to claim 11, wherein the ink includes an ultraviolet-curable ink, and wherein the printing apparatus further comprises a UV emitter integrally with the head, the UV emitter being configured to emit an ultraviolet ray for curing the ultraviolet-curable ink.

* * * * *